United States Patent Office 3,367,737
Patented Feb. 6, 1968

3,367,737
TRIMETAPHOSPHATE PROCESSES
Edward L. Moore and Chung Yu Shen, St. Louis, Mo.,
assignors to Monsanto Company, St. Louis, Mo., a corporation of Delaware
No Drawing. Filed Sept. 23, 1964, Ser. No. 398,741
8 Claims. (Cl. 23—106)

ABSTRACT OF THE DISCLOSURE

For manufacturing an alkali metal polyphosphate product, containing at least about 25 weight percent of an alkali metal trimetaphosphate, a process comprising calcining an inorganic alkali metal phosphate composition having an $M_2O/P_2O_5$ ratio from about 0.8 to about 1.4 wherein M is an alkali metal cation at a temperature of from about 450° C. to about 620° C. and in an atmosphere containing at least about 95 volume percent of water vapor; the inorganic alakli metal composition containing at least 10 weight percent of a material selected from the group consisting of monosodium dihydrogen orthophosphate, disodium dihydrogen pyrophosphate and mixtures thereof.

---

The present invention relates to novel processes for manufacturing inorganic alkali metal phosphate products that contain sodium trimetaphosphate. More particularly, the present invention relates to improved calcining processes for manufacturing sodium trimetaphosphate and mixed alkali metal trimetaphosphate products that contain a minimum amount of water-insoluble metaphosphates.

Perhaps the greatest problem facing those manufacturers of inorganic phosphate products who desire to make and sell alkali metal trimetaphosphates (such as sodium trimetaphosphate) on a commercial scale is the problem of producing trimetaphosphate products containing relatively small amounts (i.e. less than about 0.05 weight percent) of water-insoluble metaphosphates (commonly referred to as "IMP") via a commercially practical process. Heretofore the manufacture of alkali metal trimetaphosphates having very low levels of IMP was a very difficult task, and was usually prohibitively expensive. For example, it has been suggested that sodium trimetaphosphate can be made by calcining monosodium orthophosphate at temperatures above about 450° C. until the IMP level of the sodium trimetaphosphate product is reduced to an acceptable level. However, this procedure has heretofore been found to require a prolonged "soaking" period for the calcined material at temperatures above about 450° C., and for this reason was largely commercially impractical. Since, for many commercial processes and applications in which the alkali metal trimetaphosphates can be used it is desirable (and sometimes a requirement) that the alkali metal trimetaphosphate be practically completed soluble in water, the importance of a solution to this problem can readily be appreciated.

Consequently, it is a primary object of the present invention to provide calcination processes whereby sodium trimetaphosphate and mixed alkali metal trimetaphosphates that are essentially free of IMP can be manufactured in a significantly shorter period of time than was heretofore conventionally possible.

It is another object of the present invention to provide calcining processes for preparing relatively pure sodium trimetaphosphate at a significantly lower cost than that made via the conventional processes described above.

It is still another object of this invention to provide calcining processes involving the use of monosodium orthophosphate, in which processes the stickiness ordinarily resulting from such use can be minimized or eliminated.

These objects, as well as others that will become apparent from the following discussion and claims, can be accomplished by calcining the "raw" phosphatic materials in the calciner feed stream in an atmosphere containing at least about 95 volume percent of water vapor.

The present invention can be utilized not only for the manufacture of pure sodium trimetaphosphate (i.e. wherein the ratio of $Na_2O/P_2O_5$ in the final product is essentially 1.0), but also for the manufacturer of several mixtures of sodium trimetaphosphate with certain other alkali metal phosphate salts. For example, the invention can be utilized to prepare mixtures of sodium trimetaphosphate and sodium tripolyphosphate containing as little as 25 weight percent of sodium trimetaphosphate (where, for example, the $Na_2O/P_2O_5$ ratio of the final product can be as high as about 1.4). The invention can also be used for the manufacture of mixed alkali metal trimetaphosphate products (at least about 35 weight percent of each being sodium trimetaphosphate), and for the manufacture of blends of mixed alkali metal trimetaphosphates plus mixed alkali metal tripolyphosphates (the ratio of $M_2O/P_2O_5$ in said blends being above 1.0, but below about 1.4, wherein M is an alkali metal cation, and at least about 35 weight percent of M is sodium). Products having $M_2O/P_2O_5$ ratios as low as 0.8 can also be made advantageously via the present processes. Typical examples of the mixed alkali metal trimetaphosphates that can be advantageously produced in accordance with this invention are:

(a) mixtures of "pure" sodium trimetaphosphate with the double salt ($3NaPO_3 \cdot KPO_3$) of sodium trimetaphosphate plus potassium trimetaphosphate;
(b) the double salt, $3NaPO_3 \cdot KPO_3$;
(c) mixtures of the double salt, $3NaPO_3 \cdot KPO_3$ with up to about 50 weight percent of "pure" potassium trimetaphosphate;
(d) blends of sodium trimetaphosphate with lithium trimetaphosphate; etc.

Mixed alkali metal trimetaphosphate products such as these result from utilizing mixtures of various alkali metal phosphate salts in the "raw" material feed streams which are to be calcined according to the processes of this invention, the particular composition being determined not only from the $M_2O/P_2O_5$ ratio in the calciner feed stream (which is the same as that in the calcined products), but also by the ratio of the various alkali metal cations in these "raw" material feed streams. For example, composition (b), above, can be made by calcining an intimate admixture of monosodium orthophosphate and monopotassium orthophosphate, in a molar ratio in said mixture of 3:1, respectively. Trimetaphosphate compositions such as those described after (a), above, result when the ionic ratio of Na to K in the calciner feed stream is greater than 3:1, while compositions containing "free" (not combined with sodium trimetaphosphate as the double salt) potassium trimetaphosphate such as those described in (c), above, result from calcining sodium and potassium phosphate salts that have an overall ionic ratio of Na to K of less than 3:1, respectively. Note that for the manufacture of any of these mixed alkali metal trimetaphosphate compositions (which are essentially free of tripolyphosphate), as well as for the production of pure sodium trimetaphosphate, the overall $M_2O/P_2O_5$ ratio (wherein M represents alkali metal) in the calciner feed stream (as in the final product) must be practically or essentially 1.0.

When calciner feed streams having overall $M_2O/P_2O_5$ ratios between slightly more than 1.0 and about 1.4, are utilized in the calcining processes of the present invention, the products that result from their calcination contain tripolyphosphates in addition to trimetaphosphates, with relatively higher ratios yielding products that contain relatively higher levels of tripolyphosphate. For example, calciner feed streams containing phosphates having an overall $Na_2O/P_2O_5$ ratio of 1.05 can be utilized to manufacture a product that contains 91% sodium trimetaphosphate and about 9 percent of sodium tripolyphosphate while the use of an overall $Na_2O/P_2O_5$ ratio of 1.4 in the calciner feed stream results in a product that contains 25 weight percent of sodium trimetaphosphate, and about 75 weight percent of sodium tripolyphosphate. The utilization of mixture of various alkali metal phosphates salts (wherein their alkali metal moiety is a mixture of two or more different alkali metal cations) results in the production of blends of trimetaphosphates and tripolyphosphates (such as those described above) that contain mixed alkali metal cations. For example, the use of a calciner feed stream that contains 80 weight percent of monosodium orthophosphate, 10 weight percent of monopotassium orthophosphate, and 10 weight percent disodium orthophosphate (wherein the overall $M_2O/P_2O_5$ ratio is 1.104) in accordance with the present invention results in the production of a mixture of (1) sodium trimetaphosphate, plus
(2) the double salt $3NaPO_3 \cdot KPO_3$, plus
(3) sodium tripolyphosphate, as well as
(4) mixed sodium-potassium tripolyphosphates.

The overall molar ratio of trimetaphosphates to tripolyphosphates in this product is about 6.7:1, respectively.

Using $M_2O/P_2O_5$ ratios lower than 1.0 result in the production of mixtures of alkali metal trimetaphosphate with alkali metal ultraphosphate.

Practically any inorganic alkali metal phosphate salt can be utilized in the preparation of the calciner feed streams that are to be calcined in accordance with the present invention, provided they are substantially completely soluble in water to the extent of at least about 1 weight percent (i.e., 1 weight percent solutions of them in distilled water are clear), and at least about 10 weight percent of the calciner feed stream "solids" be selected from the group consisting of monosodium orthophosphate, sodium acid pyrophosphate, and mixtures thereof. However, it is preferred that at least one of the "raw" phosphate salts in the calciner feed streams contain some water of constitution (as distinguished from water of hydration). Examples of the wide variety of phosphate salts that can be utilized as "raw" materials in the practice of this invention are monosodium orthophosphate, disodium orthophosphate, monopotassium orthophosphate, dipotassium orthophosphate, monolithium orthophosphate, sodium acid pyrophosphate, trisodium acid tripolyphosphate, potassium tripolyphosphate, sodium trimetaphosphate, sodium hexametaphosphate and Graham's salt. These calciner feed streams can be either aqueous (in the form of a solution or a slurry) or anhydrous, depending upon the particular calcining procedure that one desires to utilize.

While some of the benefits of the present invention can be obtained no matter which of the above-described raw phosphatic materials are utilized in the calciner feed streams, and no matter how the calciner feed streams are prepared, for optimum results it has been found that the various alkali metal phosphate salts in the calciner feed streams should be very intimately admixed so that the feed stream is a fairly uniform blend of all of these salts. Perhaps the best way to achieve an extremely uniform, essentially "dry" calciner feed stream is to first dissolve (or slurry) the various "raw" phosphate materials into water, and subsequently remove most of the free water from the resulting mixture by evaporating it according to any of a number of conventional procedures (such as on a steam-heated drum drier) prior to the calcining step of the present invention. Of course, no mixture of phosphate salts is necessary when the pure sodium trimetaphosphate is to be manufactured from monosodium orthophosphate. Another way of achieving an extremely intimate mixture of the phosphate salts that are utilized as raw materials for the calcining processes of this invention is to mechanically blend them after they have been ground to the finely-divided state (preferably so that at least about 80 weight percent of the particles of each of the raw phosphatic materials can be passed through a U.S. standard 200-mesh screen). Other procedures for preparing fairly uniform calciner feed streams should now be readily apparent to those in the art, and can be utilized without detracting substantially from the benefits that can result from practicing this invention. Except for certain of the specific examples below, the following discussion will appear to be directed solely to the use of monosodium orthophosphate in the calciner feed stream. It should be noted, however, that what is said with respect to this particular material is also true of the blends of raw phosphatic materials described heretofore, particularly where the blends are of the preferred (extremely uniform) type.

Since at least some of the benefits that result from practicing the present invention can be obtained (as compared with those resulting from the use of conventional processes) almost immediately after the temperature of the "raw" phosphatic calciner fed stream has been raised above about 450° C. (into the conversion temperature zone), the amount of time during which the materials are exposed to such conversion temperatures is not critical. However, if a manufacturer desired to produce relatively pure trimetaphosphate products (that are considered "acceptable" according to the above-described criteria; i.e., containing less than about 0.05 weight percent of IMP), the temperature of the converting materials should generally be maintained within the conversion range described above for at least about 20 minutes, and preferably for at least about one hour. Thus, when monosodium orthophosphate is calcined for one hour at 500° C., the resulting product contains only 0.04 weight percent of IMP. By comparison, sodium trimetaphosphate that has been prepared by conventional processes in which ambient atmospheric conditions are utilized require as much as 7 hours or more of "soaking" at about 500° C. in order to reduce their IMP contents to an acceptable level (i.e., below about 0.05 weight percent).

While this invention can be advantageously practiced using any amount of water vapor above about the 95 volume percent level (in the atmospheres in the calciner, as described above), it is preferred that at least about 97 volume percent of water vapor be used. However, for optimum results, volume percent of water vapor in the atmosphere in the calciner should be maintained at approximately the 99–100 volume percent level.

The processes of this invention can be carried out in any calcining equipment capable of (a) raising the temperature of any of the calciner feed streams described above from about 25° C., to a temperature above about 450° C., and (b) maintaining the water vapor content of the atmosphere in the calciner above about 95 volume percent. Since it is often desirable that the phosphate salts be held at a temperature above about 450° C. for at least a few minutes after they have attained a desirable calcining temperature (above the temperature region that favors the formation of IMP), generally the particular equipment that is utilized should have, in addition to means for accomplishing objectives (a) and (b), above, means for maintaining its temperature within the desired conversion (to trimetaphosphate) range described heretofore. A specific example of the type of equipment that can be used in the practice of the present invention is described in the following example, which is by no means intended to illustrate the only manipulative procedures whereby the present invention can be practiced. Note that in the following example, all parts are by weight unless otherwise specified.

*Example I*

A total of 1000 parts of powdered (−200 mesh) monosodium orthophosphate are heated in a conventional indirectly heated rotary calciner to 500° C. and held at about this temperature for 1 hour. The amount of water vapor in the atmosphere in the calciner during this period of time is maintained at about 99 volume percent by continuously injecting sufficient steam into the calciner. The resulting sodium trimetaphosphate product contains only 0.04 weight percent of IMP.

The present invention is particularly surprising in view of the fact that when monosodium orthophosphate, for example, is calcined under an atmosphere containing water vapor in smaller amounts than those found to be advantageous in the practice of this invention, significantly greater amounts of IMP are formed in the product than when the material is calcined in a dry atmosphere. Thus, in a process such as that detailed in Example I, above, calcination of monosodium orthophosphate in a dry atmosphere for 1 hour at 500° C. results in a sodium trimetaphosphate product which contains 1 weight percent of IMP. Otherwise similar calcination of monosodium orthophosphate in an atmosphere containing 25 volume percent of water vapor resulted in a product containing 2 weight percent of IMP, and the utilization of an atmosphere during calcination containing as much as 90 volume percent of water vapor yielded a product which also contains 2 weight percent of IMP.

Still another surprising benefit resulting from practicing the present invention is observed in the process of Example I. This benefit relates to the stickiness ordinarily resulting from the utilization of significant amounts of monosodium orthophosphate as a raw material in such calcining processes. This stickiness is readily recognized (and disliked) in conventional calcining processes because it causes "balling" of the converting material in the calciner, and often results in material sticking undesirably to the walls of the calciner. For some unexplained reason, when the processes of the present invention are utilized; particularly the preferred processes as set out above; the expected stickiness due to the use of monosodium orthophosphate as a raw material does not occur.

The embodiments of the invention in which an exclusive property or privilege is claimed are defined as follows:

1. A process for manufacturing an alkali metal polyphosphate product containing at least about 25 weight percent of alkali metal trimetaphosphate, which process comprises calcining an inorganic alkali metal phosphate composition having an $M_2O/P_2O_5$ ratio, wherein M is an alkali metal cation, from about 0.8 to about 1.4 in an atmosphere containing at least about 95 volume percent of water vapor at a temperature of from about 450° C. to about 620° C.; said inorganic alkali metal phosphate composition containing at least about 10 weight percent of a material selected from the group consisting of monosodium dihydrogen orthophosphate, disodium dihydrogen pyrophosphate, and mixtures thereof.

2. A process as in claim 1, wherein the amount of water vapor in said atmosphere is at least about 97.5 volume percent.

3. A process for manufacturing an inorganic mixed alkali metal polyphosphate product containing at least about 35 weight percent of sodium trimetaphosphate, which process comprises calcining at a temperature between about 450° C. and about 620° C. a water soluble inorganic alkali metal phosphate composition having an overall $M_2O/P_2O_5$ ratio between about 1 and about 1.4, wherein M is a mixture of alkali metal cations and at least about 35 weight percent of M is sodium, in an atmosphere containing at least about 95 volume percent of water vapor; at least about 25 weight percent of said water soluble phosphate composition being selected from the group consisting of monosodium dihydrogen, orthophosphate, disodium dihydrogen pyrophosphate, and mixtures thereof.

4. A process as in claim 3, wherein at least about 25 weight percent of said water soluble phosphate composition is monosodium dihydrogen orthophosphate.

5. A process for manufacturing a product containing sodium trimetaphosphate and sodium tripolyphosphate, which process comprises calcining at a conversion temperature between about 450° C. and about 620° C. and in an atmosphere containing at least about 97.5 volume percent of water vapor, a sodium phosphate composition having an overall $Na_2O/P_2O_5$ ratio of from about 1 to about 1.4; at least about 10 weight percent of said sodium phosphate composition being monosodium dihydrogen orthophosphate.

6. A process for manufacturing a sodium trimetaphosphate product, which process comprises calcining monosodium dihydrogen orthophosphate at a temperature between about 450° C. and about 620° C. in an atmosphere which contains at least about 97.5 volume percent of water vapor, said sodium trimetaphosphate product having a $Na_2O/P_2O_5$ ratio of from about 1 to about 1.05, and thereafter recovering said sodium trimetaphosphate.

7. A process as in claim 6, wherein the amount of water vapor in said atmosphere is approximately 100 volume percent.

8. A process according to claim 1 wherein said alkali metal is sodium.

References Cited
UNITED STATES PATENTS

| | | | |
|---|---|---|---|
| 2,977,317 | 3/1961 | Rodis et al. | 252—135 |
| 3,230,039 | 1/1966 | Metcalf et al. | 23—106 |
| 3,230,040 | 1/1966 | Metcalf et al. | 23—106 |

MILTON EISSMAN, *Primary Examiner.*

OSCAR R. VERTIZ, *Examiner.*

L. A. MARSH, *Assistant Examiner.*